US009382850B2

United States Patent
Menon et al.

(10) Patent No.: US 9,382,850 B2
(45) Date of Patent: Jul. 5, 2016

(54) SYSTEM AND METHOD FOR CONTROLLED FUEL BLENDING IN GAS TURBINES

(71) Applicant: General Electric Company, Schenectady, NY (US)

(72) Inventors: Arvind Venugopal Menon, Greenville, SC (US); Alan Meier Truesdale, Greenville, SC (US); Abhijit Prabhakar Kulkarni, Hyderabad (IN); Predrag Popovic, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 13/848,500

(22) Filed: Mar. 21, 2013

(65) Prior Publication Data

US 2014/0283523 A1    Sep. 25, 2014

(51) Int. Cl.
*F02C 9/40* (2006.01)
*F02C 7/22* (2006.01)
*F02C 7/232* (2006.01)

(52) U.S. Cl.
CPC ... *F02C 9/40* (2013.01); *F02C 7/22* (2013.01); *F02C 7/232* (2013.01); *F23N 2037/08* (2013.01)

(58) Field of Classification Search
CPC .............. F02C 7/22; F02C 7/232; F02C 9/26; F02C 9/40; F23R 3/286; F23N 2037/08; F23K 2900/05004
USPC ........................ 60/39.463, 39.23, 39.281, 734
See application file for complete search history.

(56) References Cited

U.S. PATENT DOCUMENTS

| | | |
|---|---|---|
| 5,047,220 A | 9/1991 | Polcer |
| 5,216,876 A | 6/1993 | Gabrielson et al. |
| 5,237,812 A | 8/1993 | Mumford |
| 5,359,847 A | 11/1994 | Pillsbury et al. |
| 5,511,375 A | 4/1996 | Joshi et al. |
| 5,657,632 A | 8/1997 | Foss |
| 5,901,547 A | 5/1999 | Smith et al. |
| 5,937,631 A | 8/1999 | Holm-Larsen et al. |
| 6,298,652 B1 | 10/2001 | Mittricker et al. |

(Continued)

FOREIGN PATENT DOCUMENTS

| | | |
|---|---|---|
| EP | 1528237 | 5/2005 |
| EP | 1655456 | 5/2006 |

(Continued)

OTHER PUBLICATIONS

Beér, János Miklós, and Norman A. Chigier. "Combustion Aerodynamics." Applied Science Publishers, London (1972). (pp. 244-247).*

*Primary Examiner* — William H Rodriguez
*Assistant Examiner* — Thomas Burke
(74) *Attorney, Agent, or Firm* — Fletcher Yoder, P.C.

(57) ABSTRACT

A system includes a gas turbine engine having a combustor, and a fuel blending system. The fuel blending system further includes a first fuel supply configured to supply a first fuel, a second fuel supply configured to supply a second fuel, a first fuel circuit, a second fuel circuit, and a controller. The first fuel circuit may be configured to blend the first fuel and the second fuel to form a first to form a first fuel mixture. The second fuel circuit may be configured to blend the first fuel and the second fuel to form a second fuel mixture. The controller may be configured to regulate blending of the first fuel mixture and the second fuel mixture based on a measured operating parameter of the combustor.

21 Claims, 3 Drawing Sheets

(56) References Cited

U.S. PATENT DOCUMENTS

| | | | |
|---|---|---|---|
| 6,367,239 B1 | 4/2002 | Brown et al. | |
| 6,405,522 B1 | 6/2002 | Pont et al. | |
| 6,430,914 B1 | 8/2002 | Goidich et al. | |
| 6,505,467 B1 | 1/2003 | Fjellhaug et al. | |
| 6,585,784 B1 | 7/2003 | Mittricker | |
| 6,588,212 B1 | 7/2003 | Wallace et al. | |
| 7,000,403 B2 | 2/2006 | Henriquez et al. | |
| 7,162,864 B1 | 1/2007 | Schefer et al. | |
| 7,624,564 B2* | 12/2009 | Stuttaford et al. | 60/39.281 |
| 8,099,960 B2 | 1/2012 | Elkady et al. | |
| 8,109,095 B2 | 2/2012 | Henriksen et al. | |
| 8,117,821 B2 | 2/2012 | Mazumder et al. | |
| 8,117,823 B2 | 2/2012 | Estrada et al. | |
| 8,117,825 B2 | 2/2012 | Griffin et al. | |
| 8,117,975 B2 | 2/2012 | Allen et al. | |
| RE43,252 E | 3/2012 | Ginter | |
| 8,142,555 B2 | 3/2012 | Uji | |
| 8,146,367 B2 | 4/2012 | Trimm et al. | |
| 8,146,368 B2 | 4/2012 | Yakobson et al. | |
| 8,146,664 B2 | 4/2012 | Kaminsky et al. | |
| 8,151,574 B2 | 4/2012 | Stuttaford | |
| 8,161,724 B2 | 4/2012 | Shortlidge et al. | |
| 8,181,439 B2 | 5/2012 | Harada | |
| 8,181,464 B2 | 5/2012 | Wilbraham | |
| 8,187,350 B2 | 5/2012 | Firey | |
| 2003/0217555 A1 | 11/2003 | Gerhold | |
| 2009/0094960 A1 | 4/2009 | Eroglu et al. | |
| 2009/0100822 A1 | 4/2009 | Osakabe et al. | |
| 2009/0193788 A1 | 8/2009 | Szepek et al. | |
| 2009/0223226 A1 | 9/2009 | Koizumi et al. | |
| 2010/0162678 A1* | 7/2010 | Annigeri et al. | 60/39.281 |
| 2010/0162711 A1 | 7/2010 | Zuo et al. | |
| 2010/0170252 A1 | 7/2010 | Venkataraman et al. | |
| 2010/0229524 A1 | 9/2010 | Bhatnagar et al. | |
| 2010/0319353 A1 | 12/2010 | Intile | |
| 2011/0005189 A1* | 1/2011 | Uhm et al. | 60/39.281 |
| 2011/0036092 A1* | 2/2011 | Lawson et al. | 60/772 |
| 2011/0162343 A1* | 7/2011 | Ouellet et al. | 60/39.281 |
| 2011/0277440 A1 | 11/2011 | Brunhuber et al. | |
| 2011/0283710 A1 | 11/2011 | Brunhuber et al. | |
| 2012/0031100 A1 | 2/2012 | Allam | |
| 2012/0037056 A1 | 2/2012 | Scherer | |
| 2012/0067021 A1 | 3/2012 | Aggelopoulos | |
| 2012/0067056 A1 | 3/2012 | Palmer et al. | |
| 2012/0085079 A1 | 4/2012 | Kaminsky | |
| 2012/0096830 A1 | 4/2012 | Manoharan | |
| 2012/0110974 A1 | 5/2012 | Davis, Jr. et al. | |
| 2012/0117978 A1 | 5/2012 | Allam | |
| 2012/0125008 A1 | 5/2012 | Prociw et al. | |
| 2012/0125012 A1 | 5/2012 | Greer et al. | |
| 2012/0137696 A1 | 6/2012 | Desai et al. | |
| 2012/0137703 A1 | 6/2012 | Desai et al. | |
| 2012/0144832 A1 | 6/2012 | Herbon et al. | |
| 2012/0153639 A1 | 6/2012 | Yakobson et al. | |
| 2014/0260309 A1* | 9/2014 | Menon | F23R 3/36 60/780 |

FOREIGN PATENT DOCUMENTS

| | | |
|---|---|---|
| EP | 2206966 | 7/2010 |
| EP | 2444632 | 4/2012 |
| WO | WO2009068427 | 6/2009 |
| WO | WO2011082949 | 7/2011 |
| WO | WO2012003076 | 1/2012 |
| WO | WO2012003079 | 1/2012 |
| WO | WO2012006729 | 1/2012 |
| WO | WO2012040790 | 4/2012 |
| WO | WO2012049056 | 4/2012 |
| WO | WO2012058277 | 5/2012 |
| WO | WO2012060739 | 5/2012 |
| WO | WO2012063102 | 5/2012 |
| WO | WO2012072362 | 6/2012 |

* cited by examiner

SYSTEM AND METHOD FOR CONTROLLED FUEL BLENDING IN GAS TURBINES

BACKGROUND OF THE INVENTION

The subject matter disclosed herein relates to gas turbine systems, and more particularly, to a system for blending fuel in a gas turbine system.

Gas turbine systems typically include at least one gas turbine engine having a compressor, a combustor, and a turbine. The combustor may have one or more combustion systems with fuel nozzles for receiving fuel gases. Certain fuel gases may not be, by themselves, suitable for use as a fuel source in combustion-driven equipment, such as in a gas turbine system. For example, certain fuel gases may be less available in larger quantities, or might be more costly to use. By further example, certain fuel gases may be abundantly found, but may not have, by themselves, the chemical composition suitable for efficient operation within the gas turbine system. Furthermore, certain fuel gases may result in undesirable exhaust emissions, such as nitrogen oxides (NOx), sulfur oxides (SOx), carbon monoxide (CO), carbon dioxide ($CO_2$), and so forth. The emission levels may exceed thresholds, such as minimum emission compliance levels, for gas turbine systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine having a combustor, and a fuel blending system. The fuel blending system further includes a first fuel supply configured to supply a first fuel, a second fuel supply configured to supply a second fuel, a first fuel circuit, a second fuel circuit, and a controller. The first fuel circuit may be configured to blend the first fuel and the second fuel to form a first to form a first fuel mixture. The second fuel circuit may be configured to blend the first fuel and the second fuel to form a second fuel mixture. The controller may be configured to regulate blending of the first fuel mixture and the second fuel mixture based on a measured operating parameter of the combustor.

In a second embodiment, a system includes a fuel blending system having a first fuel circuit, a second fuel circuit, and a controller. The first fuel circuit may be configured to supply a first fuel mixture of a first fuel and a second fuel to a primary fuel nozzle of a turbine combustor. The second fuel circuit may be configured to supply a second fuel mixture of the first fuel and the second fuel to a secondary fuel nozzle of the turbine combustor. The controller may be configured to regulate a first blending ratio of the first fuel mixture and a second blending ratio of the second fuel mixture based on a measured operating parameter of the turbine combustor.

In a third embodiment, a method includes measuring an operating parameter of a gas turbine combustor, where the operating parameter is used to regulate blending of a first fuel with a second fuel. The method further includes blending the first fuel with a second fuel based on the operating parameter to form a first fuel mixture having a first blending ratio. The method further includes blending the first fuel with the second fuel based on the operating parameter to form a second fuel mixture having a second blending ratio, where the first and second blending ratios are different.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
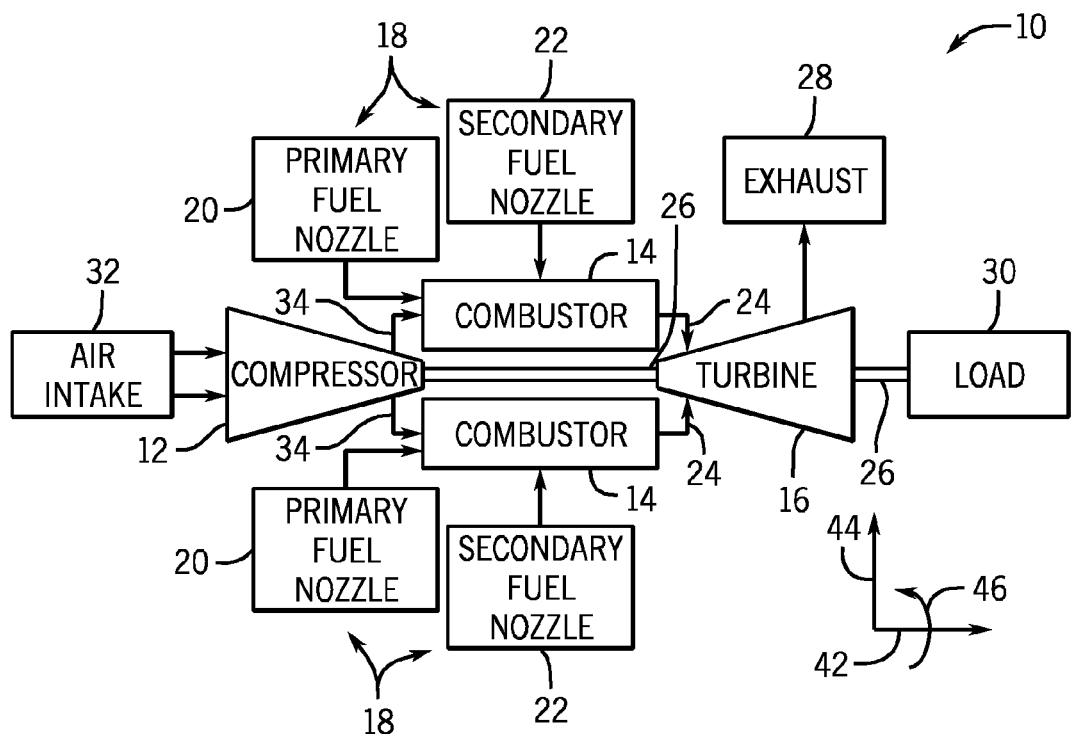
FIG. 1 is a schematic of an embodiment of a gas turbine system having a compressor, a plurality of combustors, a turbine, and a plurality of fuel nozzles.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed towards a fuel blending system which may receive and blend a first fuel source with a second fuel source to form a fuel mixture. The fuel blending system may then transfer the fuel mixture to a fuel nozzle of combustion-driven equipment, such as a combustor in a gas turbine system. In certain embodiments, the fuel blending system may receive and blend a natural gas with one or more process gases (e.g., a blast furnace gas, a coke oven gas, a refinery flue gas, or any synthetic gas generated as a result of a refinery or chemical process) to form the fuel mixture. In particular, the fuel blending system may be configured to blend the natural gas and the process gas based on a measured composition of the first fuel source (e.g., a measured composition of the process gas). As such, blending may be regulated, so that the use of certain fuel sources is optimized or maximized. For example, the fuel blending system may control blending of the fuel mixture such that the amount of process gas is optimized or maximized when generating or creating the fuel mixture of natural gas and process gas.

In yet other embodiments, after transferring the fuel mixture to the combustor in the gas turbine system, the fuel blending system may monitor the combustion dynamics of the combustor. For example, certain operating parameters of the combustor, such as flame intensity, pressure, temperature, vibration, or the chemical composition of the burned fuel mixture, may be measured. By further example, the monitored operating parameters may include or identify variations, such as pulsations or oscillations, in pressure, temperature, flame intensity, and/or chemical compositions. The fuel blending system may be further configured to blend the fuel mixture based on one or more measured operating parameters, and thus may use fuel sources more efficiently and effectively. For example, blending may be regulated so that only a certain amount of additional fuel is transferred to the combustor for continued combustor operation. Additionally, blending may be adjusted in a feedback control loop so that one or more operating parameters of the combustor remain within combustion boundaries of the system. The fuel blending system may also control the blending of the fuel mixture, so that a certain quantity of a particular fuel is used to create the fuel mixture. That is, as mentioned above, an amount of a particular fuel (e.g., a process gas) used in generating the fuel mixture may be maximized or optimized based at least partially on feedback (e.g., measured operating parameters) from the combustor. In addition, the fuel blending system may supply a particular blend of fuel that enables the combustor to achieve desired low levels of emissions, such as NOx emissions, SOx emissions, CO emissions, and/or $CO_2$ emissions.

Turning now to the drawings, FIG. 1 illustrates a block diagram of an embodiment of a gas turbine system 10. The gas turbine system 10 includes a compressor 12, turbine combustors 14, and a turbine 16. The turbine combustors 14 includes fuel nozzles 18 which route a liquid fuel, a gas fuel (e.g., natural gas), and/or a blended fuel (e.g., a mixture of natural gas and process gas) into the turbine combustors 14. For example, the process gas may include a blast furnace gas, a coke oven gas, a refinery flue gas, a synthetic gas generated as a result of a refinery or chemical process, or a combination thereof. As shown, each turbine combustor 14 may have multiple fuel nozzles 18. More specifically, the turbine combustors 14 may each include primary fuel nozzles 20 and secondary fuel nozzles 22. As discussed in detail below, the primary fuel nozzles 20 and secondary fuel nozzles 22 receive fuel for use within the turbine combustors 14. The turbine combustors 14 ignite and combust an oxidant—fuel mixture (e.g., an air-fuel mixture), and then pass resulting hot pressurized combustion gasses 24 (e.g., exhaust) into the turbine 16. Turbine blades within the turbine 16 are coupled to a shaft 26 of the gas turbine system 10, which may also be coupled to several other components throughout the turbine system 10. As the combustion gases 24 flow against and between the turbine blades of the turbine 16, the turbine 16 is driven into rotation, which causes the shaft 26 to rotate. Eventually, the combustion gases 24 exit the turbine system 10 via an exhaust outlet 28. Further, in the illustrated embodiment, the shaft 26 is coupled to a load 30, which is powered via the rotation of the shaft 26. The load 30 may be any suitable device that generates power via the rotational output of the turbine system 10, such as an electrical generator, a propeller of an airplane, or other load.

The compressor 12 of the gas turbine system 10 includes compressor blades. The compressor blades within the compressor 12 are coupled to the shaft 26, and will rotate as the shaft 26 is driven to rotate by the turbine 16, as discussed above. As the compressor blades rotate within the compressor 12, the compressor 12 compresses air (or any suitable oxidant) received from an air intake 32 to produce pressurized air 34. The pressurized air 34 is then fed into the fuel nozzles 18 of the combustors 14. As mentioned above, the fuel nozzles 18 mix the pressurized air 34 and fuel to produce a suitable mixture ratio for combustion, e.g., a combustion that causes the fuel to more completely burn, so as not to waste fuel or cause excess emissions. In the following discussion, reference may be made to an axial direction or axis 42 (e.g., a longitudinal axis) of the combustor 14, a radial direction or axis 44 of the combustor 14, and a circumferential direction or axis 46 of the combustor 14.

Figure 2:
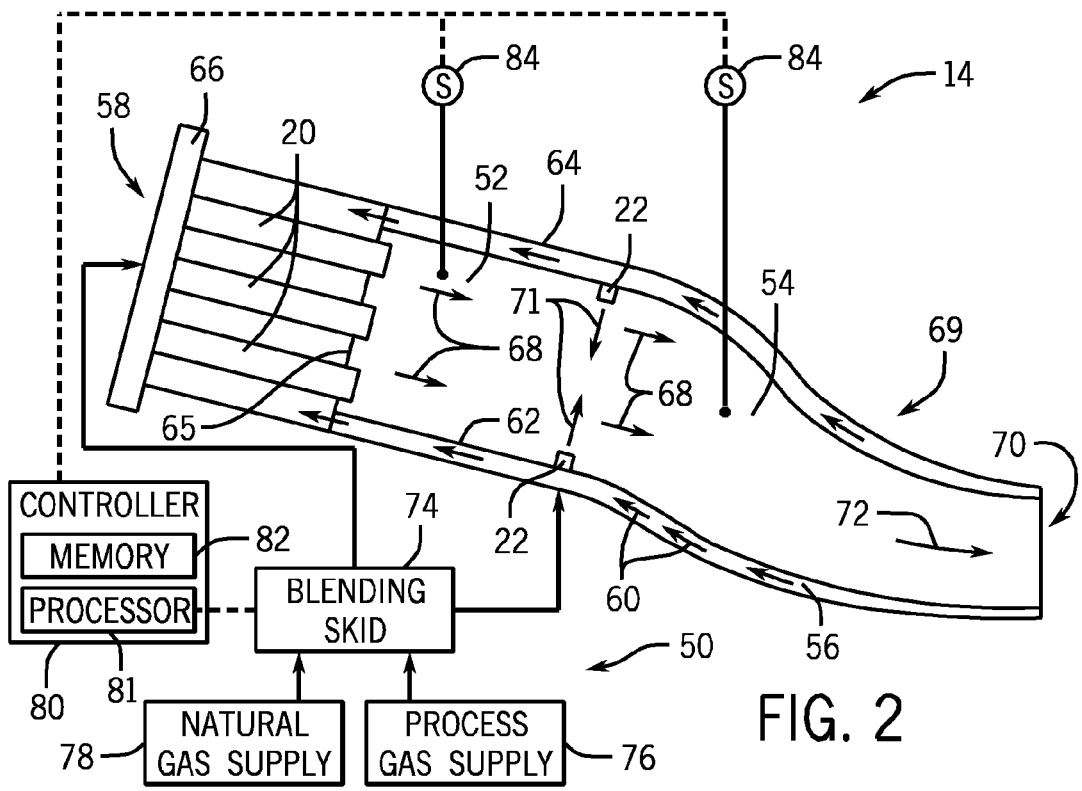
FIG. 2 is a cross-sectional side view of an embodiment of one of the turbine combustors illustrated in FIG. 1, configured to receive fuel gases from a fuel blending system.

FIG. 2 is a cross-sectional side view of an embodiment of one of the combustors 14 in the gas turbine system 10 of FIG. 1, where the combustor 14 is configured to receive fuel from a fuel blending system 50 (e.g., a multi-fuel supply system). As mentioned above, the combustor 14 is operatively coupled to the compressor 12 and the turbine 16. Specifically, the combustor 14 combusts the pressurized air 34 from the compressor 12 with fuel from the fuel blending system 50 and directs the resulting combustion gases 24 into the turbine 16. In the illustrated embodiment, the combustor 14 includes include a primary combustion zone 52 and a secondary combustion zone 54 downstream from the primary combustion zone 52. In other embodiments, the combustor 14 may have only the primary combustion zone 52 or a plurality of combustion zones (e.g., two, three, four, five, or more combustion zones). The fuel nozzles 18 route a liquid fuel, a gas fuel, and/or a blended fuel from the fuel blending system 50 into the primary and secondary combustion zones 52 and 54. For example, the fuel may be natural gas, a process gas, and/or a mixture of natural gas and process gas. For example, the process gas may include a blast furnace gas, a coke oven gas, a refinery flue gas, any synthetic gas generated as a result of a refinery or chemical process, or a combination thereof. In certain embodiments, the fuel blending system 50 may be configured to send a different type of fuel, or a different mixture of fuel, to different fuel nozzles 18 of the combustor 14. For example, in one embodiment, the fuel blending system 50 may provide a first fuel mixture (e.g., having a first fuel composition) to the primary fuel nozzles 20, which are configured to route the first fuel mixture to the primary combustion zone 52. Concurrently, the fuel blending system 50 may also provide a second fuel mixture (e.g., having a second fuel composition different from the first fuel composition of the first fuel mixture) to the secondary fuel nozzles 22, which are configured to route the second fuel mixture to the secondary combustion zone 54. For example, the first and second fuel mixtures may each be mixtures of natural gas and process gas, but the first and second fuel mixtures may have different blend ratios of natural gas to process gas. In this manner, each combustion zone (e.g., the primary and secondary combustion zones 52 and 54) of the combustor 14 may receive a different or unique fuel mixture from the fuel blending system 50.

In the illustrated embodiment, the combustor 14 has an annulus 56 configured to receive pressurized air from the compressor 12. The pressurized air received by the annulus 56 from the compressor 12 is directed towards a head end 58 of the turbine combustor, as shown by arrows 60. In certain embodiments, the annulus 56 of the combustor 14 may be defined by a liner 62 (e.g., an inner wall) and a flow sleeve 64 (e.g., an outer wall), where the flow sleeve 64 surrounds the liner 62 (e.g., coaxially or concentrically). The head end 58 of the turbine combustor 14 may have a cover plate 65 and an end plate 66, which may at least partially support the primary fuel nozzles 20. In certain embodiments, the primary fuel nozzles 20 may combine the fuel received by the fuel blending system 50 with the pressurized air from the compressor 12 to create an air/fuel mixture. The air/fuel mixture is then combusted in the primary combustion zone 52 to produce combustion gases 68. While the illustrated embodiment shows fuel being supplied to the primary fuel nozzles 20 by only the fuel blending system 50, other embodiments of the combustor 14 may include multiple fuel supplies, and/or multiple fuel blending systems 50. Furthermore, in embodiments having multiple fuel supplies and/or multiple fuel blending systems 50, the fuel supplies may provide the same fuel types, or different fuel types, to the primary fuel nozzles 20.

The combustion gases 68 created in the primary combustion zone 52 flow downstream from the head end 58 of the combustor 14 to the tail end 70 (e.g., a downstream end of a transition piece 69) of the combustor 14. As mentioned above, in certain embodiments, the combustor 14 may include the secondary combustion zone 54 with secondary fuel nozzles 22. The secondary fuel nozzles 22 may inject additional fuel into the stream of combustion gases 68 for combustion in the secondary combustion zone 54, as indicated by arrows 71. The secondary fuel injection 71 may be angled upstream toward the head end 58, downstream toward the tail end 70, or generally crosswise (e.g., perpendicular) to the flow of gases 68. In certain embodiments, the secondary fuel nozzles 22 may combine the fuel received by the fuel blending system 50 with the pressurized air from the annulus 56 (i.e., the pressurized air supplied by the compressor 12, as shown by arrows 60) to create an air/fuel mixture, which may be injected 71 and combusted in the secondary combustion zone 54 to produce additional combustion gases 68. In other embodiments, the secondary fuel nozzles 22 inject fuel and air separately into the stream of combustion products 68 for combustion in the secondary combustion zone 54. While the illustrated embodiment shows fuel being supplied to the secondary fuel nozzles 22 by only the fuel blending system 50, other embodiments of the combustor 14 may include multiple fuel supplies, and/or multiple fuel blending systems 50. In embodiments having multiple fuel supplies and/or multiple fuel blending systems 50, the fuel supplies may provide the same fuel type, or different fuel type, to the secondary fuel nozzles 22. After combustion in the secondary combustion zone 54, the combustion gases 68 continue downstream, as indicated by arrow 72, toward the turbine 16.

In certain embodiments, the fuel blending system 50 may include a blending skid 74, at least one process gas supply 76 for supplying a process gas, a natural gas supply 78 for supplying a natural gas, and a controller 80 with a processor 81 and a memory 82. The process gas supply 76 may be any type of process gas, such as, for example, a blast furnace gas, a coke oven gas, a refinery flue gas, a synthetic gas generated as a result of a refinery or chemical process, or a combination thereof. Thus, the process gas supply 76 may include a first process gas supply (e.g., a coke oven gas supply, a second process gas supply (e.g., a blast furnace gas supply), a third process gas supply, or any other number of process gas supplies. The blending skid 74 regulates the blending of the process gas supply 76 (e.g., the coke oven gas, the blast furnace gas, or a combination of the two) with the natural gas supply 78. In certain embodiments, the controller 80 of the fuel blending system 50 may control operations of the blending skid 74 by regulating the blending of the process gas supply 76 with the natural gas supply 78.

In one embodiment, the controller 80 may regulate blending based on a measured composition of the process gas supply 76. For example, the controller 80 may determine the chemical composition of the process gas supply 76 and measure the concentration of process gas supply 76 components, such as nitrogen, carbon dioxide, hydrogen sulfide, oxygen, and so forth. Based on measured concentrations of constituent components, the controller 80 may adjust the blending of the natural gas supply 78 (e.g., natural gas) with the process gas supply 76 (e.g., process gas) to maintain or regulate the concentrations of various components within desired operating boundaries of the combustor 14. In another embodiment, the controller 80 may regulate blending based on a measured composition of the natural gas supply 78. For example, the controller 80 may determine the chemical composition of the natural gas supply 78 and measure the concentration of the natural gas supply 78 components, such as nitrogen, carbon dioxide, hydrogen sulfide, oxygen, and so forth. Based on measured concentrations of the constituent components, the controller 80 may adjust the blending of the natural gas supply 78 (e.g., natural gas) with the process gas supply 76 (e.g., process gas) to maintain or regulate the concentrations of various components within desired operating boundaries of the combustor 14.

Furthermore, the controller 80 may regulate blending based on parameters set by an operating user's input, which may be stored in the memory 82 of the controller 80. The memory 82 may further be used to store other measured values, such as operating parameters of the combustor 14, or measured concentrations of fuel gas components (e.g., components of the natural gas or the process gas). In yet other embodiments, the controller 80 may be configured to regulate blending based on a measured composition of the natural gas supply 78, the process gas supply 76, or based on measured compositions of both the natural gas supply 78 and the process gas supply 76 (i.e., the blended mixture of the natural gas supply 78 and the process gas supply 76). For example, the controller 80 may measure the concentration of natural gas supply 78 components such as nitrogen, carbon dioxide, hydrogen sulfide, or oxygen.

In other embodiments, the controller 80 of the fuel blending system 50 may control operations of the blending skid 74 based on combustor 14 operating feedback. For example, the operating feedback may be parameters measured from within the primary and/or secondary combustion zones 52 and 54 or other areas of the combustor 14, such as the fuel nozzles 18 (e.g., primary and secondary fuel nozzles 20 and 22), exhaust section 28, turbine 16, or any combination thereof. That is, the operating dynamics of the combustor 14 may be quantified with various combustion dynamics parameters, and may be obtained with a plurality of sensors 84.

The sensors 84 may be any suitable type of sensors, such as, for example, a flame detector or an acoustic probe, and the sensors 84 may be positioned in the primary and/or secondary combustion zones 52 and 54. The flame detector may be configured to measure a combustion dynamics parameter, such as flame intensity of a flame within the combustor 14, while the acoustic probe may be configured to measure frequency or amplitude of a tone of the combustor 14. The sensors 84 may also be other types of sensors, such as, for example, optical sensors, mechanical sensors, pressure sensors, temperature sensors, vibration sensors, or electrical sensors, which may be configured to measure other useful combustion dynamics operating parameters such temperature, pressure, and so forth. For example, the sensor feedback may be used to identify pulsations or oscillations in pressure, temperature, flame intensity, light intensity, noise, emissions levels, or any combination thereof. The sensors 84 may send measured data of the combustor 14 operating parameters to the controller 80, which may then use the measured data to further regulate the operation of the blending skid 74 and the fuel blending system 50.

The memory 82 of the controller 80 may further store the measured combustor 14 operating parameters. In this manner, the controller 80 may regulate a feedback control loop that may adjust the ratio of the natural gas supply 78 (e.g., natural gas) to the process gas supply 76 (e.g., process gas) within the fuel mixture based on combustor 14 operating feedback from the primary and/or secondary combustion zones 52 and 54 or other areas of the combustor 14.

Figure 3:
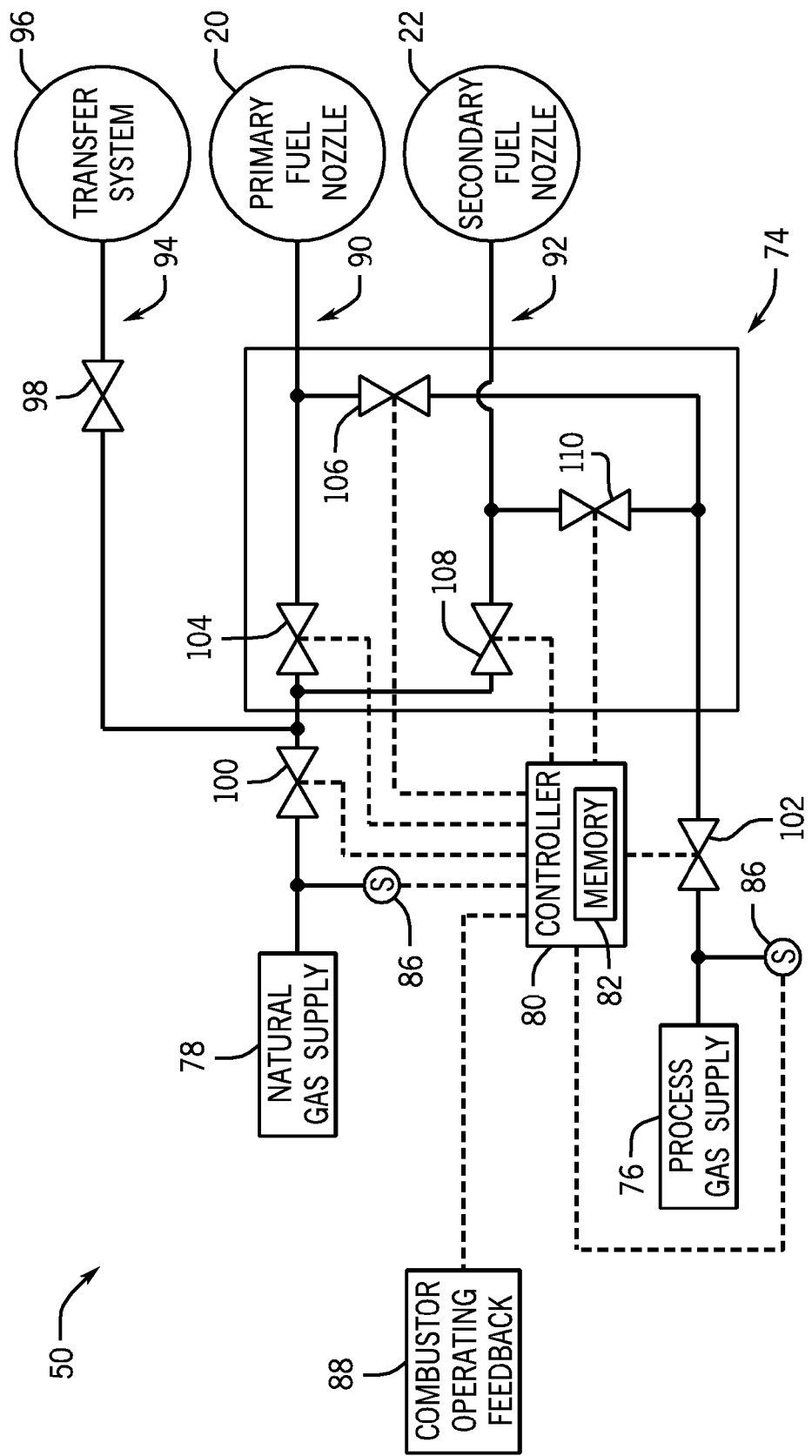
FIG. 3 is a schematic of an embodiment of the fuel blending system of FIG. 2, where the fuel blending system includes a blending skid, a process gas supply, a natural gas supply, and a controller.

FIG. 3 is a schematic of an embodiment of the fuel blending system 50 of FIG. 2, where the fuel blending system 50 includes the blending skid 74, the process gas supply 76, the natural gas supply 78, and the controller 80. As discussed in FIG. 2, the controller 80 may control operation of the blending skid 74, such that the blending skid 74 regulates the blending of the process gas supply 76 (e.g., a blast furnace gas, a coke oven gas, a refinery flue gas, a synthetic gas generated as a result of a refinery or chemical process, or a combination thereof.) with the natural gas supply 78 (e.g., the natural gas). The controller 80 may regulate the operation of the blending skid 74 based on a measured component composition of the process gas supply 76. In other embodiments, the controller 80 may regulate the operation of the blending skid 74 based on a measured component composition of the natural gas supply 78, the process gas supply 78, or measured compositions of both the process gas supply 76 and the natural gas supply 78 (i.e., the blended mixture of the process gas supply 76 and the natural gas supply 78). Components of the gas supplies 76 and 78, such as nitrogen, carbon dioxide, hydrogen sulfide, or oxygen, may be measured with sensors 86, and the measured data may be sent to the processor 81 and/or memory 82 of the controller 84, or to another component of the controller 84.

The controller 80 may also regulate the operation of the blending skid 74 based on combustor 14 operating feedback 88 (e.g., feedback from the primary and/or secondary combustion zones 52 and 54). For example, combustor 14 operating feedback 88 may include measured data on various combustion dynamics parameters, such as, for example, flame intensity, frequency or amplitude of a tone, temperature, pressure, and so forth. Other combustion dynamics parameters that may be indentified include pulsations or oscillations in pressure, temperature, flame intensity, light intensity, noise, emissions levels, or any combination thereof. The combustion dynamics parameters measure the combustion dynamics within the primary and/or secondary combustion zones 52 and 54 or other areas of the combustor 14, and may be based on the properties of the fuel being used within the combustion zones 52 and 54. In certain embodiments, it may be desirable to maintain combustion dynamics parameters within certain operating boundaries so as to regulate the operability or efficiency of the combustor 14, and/or to reduce hardware degradation within the gas turbine system 10. For example, the concentration of certain constituents, such as nitrogen, carbon dioxide, hydrogen sulfide, oxygen, and so forth, may be maintained below threshold levels of the combustor 14. To this end, the controller 80 may be used to regulate or operate a feedback control loop and regulate the blending operations of the blending skid 74, such that the combustion dynamics parameters remain within the operating boundaries of the combustor 14.

As shown, the blending skid 74 of the fuel blending system 50 may regulate the blending of the process gas supply 76 (e.g., e.g., a blast furnace gas, a coke oven gas, a refinery flue gas, a synthetic gas generated as a result of a refinery or chemical process, or a combination thereof) with the natural gas supply 78 (e.g., the natural gas) within one or more fuel circuits. In the illustrated embodiment, the blending skid 74 includes a first fuel circuit 90, a second fuel circuit 92, and a third fuel circuit 94. In other embodiments, the blending skid 74 may have four, five, six or any suitable number of fuel circuits. Each fuel circuit may transfer a fuel mixture of the natural gas supply 78 and the process gas supply 76 to the fuel nozzles 18 of the combustor 14, to a transfer skid, or to another combustor 14. For example, the first fuel circuit 90 may transfer a first fuel mixture to one or more primary fuel nozzles 20, while the second fuel circuit 92 may transfer a second fuel mixture to one or more secondary fuel nozzles 22. In addition, the fuel blending system 50 may deliver a blended or unblended fuel to a transfer system 96 (e.g., a transfer skid or fuel transfer system). For example, in one embodiment, the third fuel circuit 94 may transfer only the natural gas supply 78 to the transfer system 96, and transfer of fuel from the natural gas supply 78 to the transfer system 96 may be regulated using a gas transfer valve 98.

Moreover, a plurality of valves may enable the blending skid 74 to blend different ratios of natural gas from the natural gas supply 78 relative to process gas from the process gas supply 76 for different fuel circuits of the blending skid 74. In certain embodiments, the controller 80 may control the operation of the valves based on measured data received from the combustor 14 operating feedback 88, based on measured component compositions of the natural and/or process gas supplies 76 and 78, and/or based on user input. The first fuel circuit 90 may have a first fuel mixture with a first ratio of natural gas supply 78 (e.g., natural gas) to process gas supply 76 (e.g., process gas). The first fuel mixture may be formed when gas release valves 100 and 102 enable gas flow from the natural gas supply 78 and the process gas supply 76, respectively, into the blending skid 74. As shown, the blending skid 74 further includes gas control valves 104 and 106. Gas control valve 104 regulates the flow of natural gas from the natural gas supply 78 within the first fuel circuit 90, while gas control valve 106 regulates the flow of process gas from the process gas supply 76 within the first fuel circuit 90. Together, the gas control valves 104 and 106 may create a first blend ratio of the natural gas supply 78 (e.g. natural gas) to the process gas supply 76 (e.g., process gas). Similarly, the second fuel circuit 90 may have a second fuel mixture with a second ratio of natural gas supply 78 (e.g., natural gas) to process gas supply 76 (e.g., process gas). The second fuel mixture may be formed when gas release valves 100 and 102 release natural gas from the natural gas supply 78 and process gas from the process gas supply 76 into the blending skid 74. Thereafter, gas control valves 108 and 110 regulate blending of the natural gas and process gas within the second fuel circuit 90. More specifically, gas control valve 108 regulates the flow of natural gas from natural gas supply 78 within the second fuel circuit 92, while gas control valve 110 regulates the flow of process gas from the process gas supply 76 within the second fuel circuit 92. Together, the gas control valves 108 and 110 create a second blend ratio of the natural gas supply 78 (e.g., natural gas) to the process gas supply 76 (e.g., process gas). As mentioned above, the first fuel circuit 90 may produce a first blend ratio that is different from the second blend ratio in the second fuel circuit 92. More specifically, the controller 80 may be able to form fuel mixtures with different blend ratios for each fuel circuit of the fuel blending system 50. Furthermore, each fuel circuit of the fuel blending system 50 may transfer fuel mixtures with different blend ratios to the various fuel nozzles 18 of the combustor 14.

Figure 4:
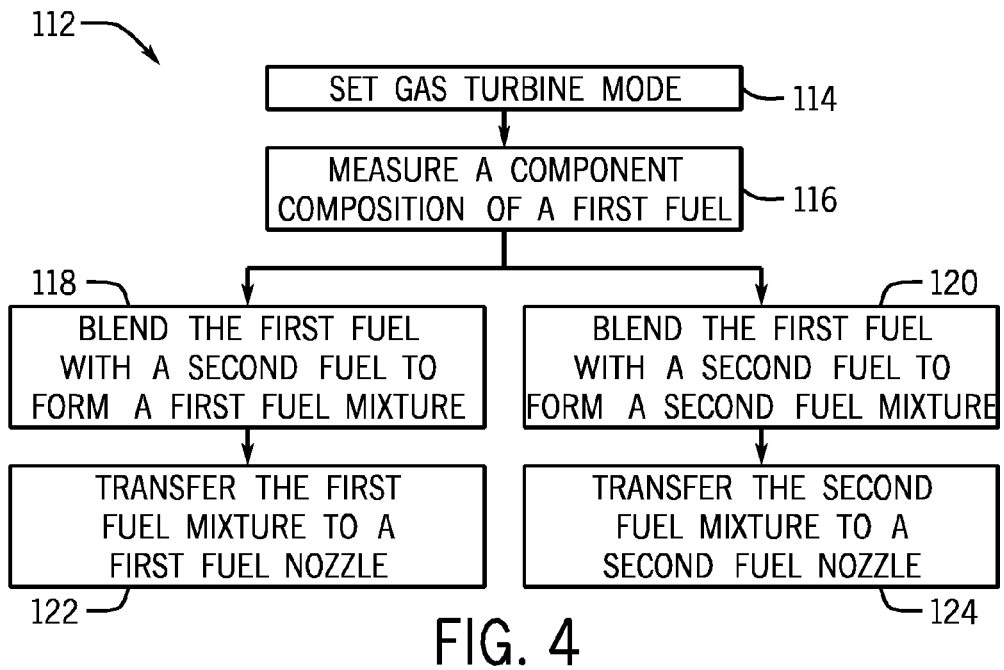
FIG. 4 is a flow diagram illustrating an embodiment of a method by which a fuel blending system may blend a first fuel and a second fuel.

FIG. 4 is a flow diagram illustrating an embodiment of a process 112 (e.g., a computer-implemented process) by which the fuel blending system 50 may blend a first fuel (e.g., natural gas) and a second fuel (e.g., a process gas). The process 112 begins by setting a gas turbine mode of the gas turbine system 10 of FIG. 1 (block 114). In certain embodiments, the gas turbine system 10 may be set to a premixing mode, where fuel is supplied to both the primary fuel nozzles 20 and the secondary fuel nozzles 22. In other embodiments, other modes of operation for the gas turbine system 10 may be employed, such as a primary mode, secondary mode, a full load mode, a part load mode, a startup mode, a steady state mode, and so forth. Each mode of the gas turbine system 10 may use a different blend ratio of the first fuel to the second fuel, and may additionally provide a different blend ratio for each fuel nozzle of the combustor. For example, the gas turbine engine system 10 may blend a different blend ratio of the first fuel to the second fuel in the premixing mode than it would in a steady state mode, startup mode, etc.

In certain embodiments, after the gas turbine system 10 is set to a gas turbine mode, the controller 80 may measure a component composition of a first fuel, such as, for example, process gas from the process gas supply 76 (block 116). As described in detail above, the controller 80 may regulate the operation of the blending skid 74 of the fuel blending system 50 based on a measured component composition of the process gas from the process gas supply 76 (e.g., a blast furnace gas, a coke oven gas, a refinery flue gas, a synthetic gas generated as a result of a refinery or chemical process, or a combination thereof.). For example, the sensors 86 (as shown in FIG. 3) may assess the chemical composition of the process gas from process gas supply 76 by measuring the concentration of components like nitrogen, carbon dioxide, hydrogen sulfide, oxygen, and so forth. In other embodiments, the controller 80 may regulate the operation of the blending skid 74 based on a measured component composition of the natural gas from the natural gas supply 78, or gases of both the process gas supply 76 and the natural gas supply 78.

The process 112 may further include blending the first fuel with a second fuel to form a first fuel mixture (block 118) and a second fuel mixture (block 120). For example, in certain embodiments, process gas from the process gas supply 76 may be blended with natural gas from the natural gas supply 78 at a first ratio to form a first fuel mixture within a first fuel circuit 90 (block 118). Likewise, process gas from the process gas supply 76 may be blended with natural gas from the natural gas supply 78 at a second ratio to form a second fuel mixture within a second fuel circuit 92 (block 120). Each fuel circuit of the blending skid 74 may have a different blend ratio of the natural gas supply 78 (e.g., natural gas) to the process gas supply 76 (e.g., process gas). Thus, the first fuel mixture of the first fuel circuit 90 may have a different blend ratio than the second fuel mixture of the second fuel circuit 92. In other embodiments, the first fuel mixture of the first fuel circuit 90 may have the same blend ratio as the second fuel mixture of the second fuel circuit 92. In the illustrated embodiment, two fuel circuits are shown. Each fuel circuit has a different blend ratio. In other embodiments, three, four, five, or any other number of fuel circuits with or without different blend ratios may be given. Furthermore, based on the data received from the sensors 86, the controller 80 may adjust the ratio of the blend within a particular fuel circuit. For example, if the concentration of nitrogen within the process gas supply 76 is known or measured, then the controller 80 may blend or adjust a fuel mixture within the first fuel circuit 90 that is optimized to achieve certain operating parameters within the combustor 14 (e.g., a desired amount of nitrogen within the combustion products 68).

Last, the process 112 may include transferring the first fuel mixture to a first fuel nozzle (block 122), and the second fuel mixture to a second fuel nozzle (block 124). For example, the first fuel circuit 90 may be directed towards the primary fuel nozzles 20, while the second fuel circuit 92 may be directed towards the secondary fuel nozzles 22. As such, the fuel nozzles 18 of the combustor 14 may each receive a different blend ratio of the natural gas supply 78 to the process gas supply 76. That is, the primary fuel nozzles 20 may receive the first fuel mixture having a first blend ratio from the first fuel circuit 90, and the secondary fuel nozzles 22 may receive the second fuel mixture having a second fuel ratio (e.g., different from the first fuel ratio) from the second fuel circuit 92.

Figure 5:
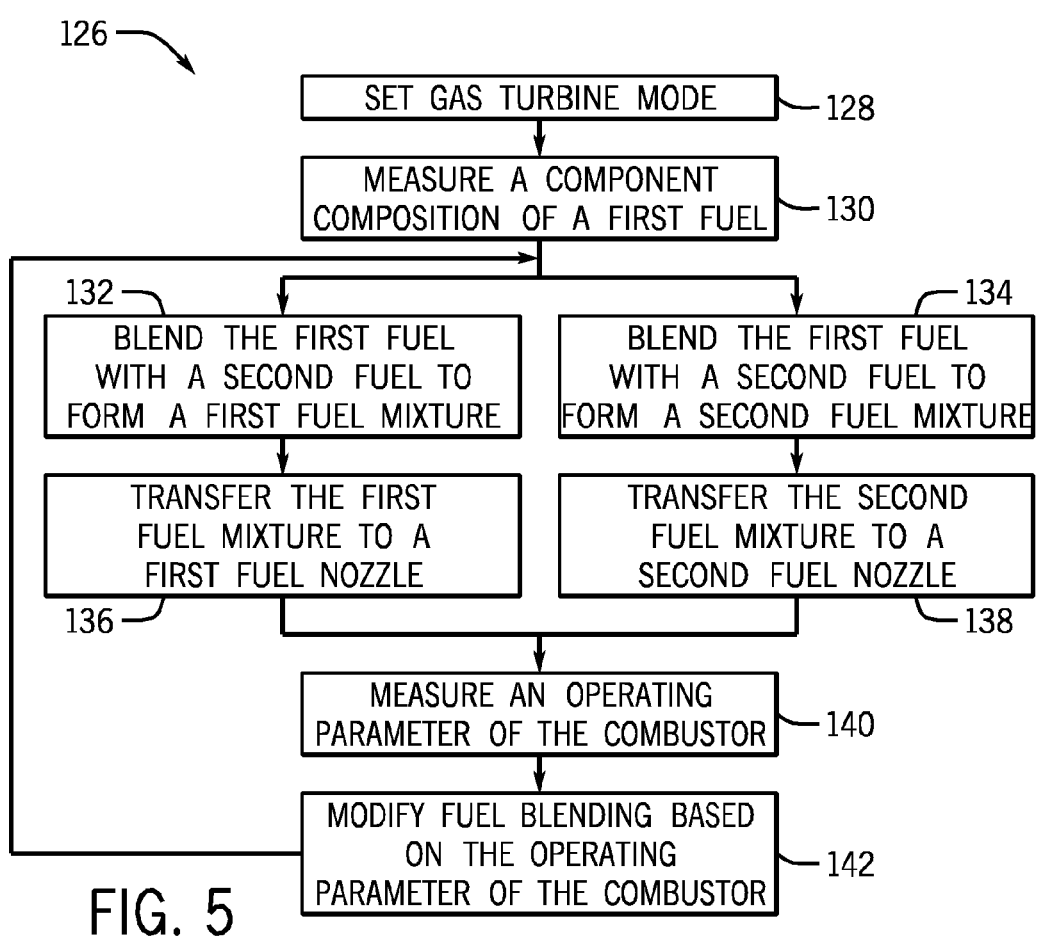
FIG. 5 is a flow diagram illustrating an embodiment of a method by which a fuel blending system may modify fuel blending based on an operating parameter of the combustor.

FIG. 5 is a flow diagram illustrating an embodiment of a process 126 by which the fuel blending system 50 may modify fuel blending based on an operating parameter of the combustor 14. The process 126 begins by setting a gas turbine mode of the gas turbine system 10 of FIG. 1 (block 128). In certain embodiments, the gas turbine system 10 may be set to a premixing mode, where fuel is supplied to both the primary fuel nozzles 20 and the secondary fuel nozzles 22. In other embodiments, other modes of operation for the gas turbine system 10 may be employed, such as a primary mode, secondary mode, a full load mode, a part load mode, a startup mode, a steady state mode, and so forth. Each mode of the gas turbine system 10 may use a different blend ratio of the first fuel to the second fuel, and may additionally provide a different blend ratio for each fuel nozzle of the combustor. For example, the gas turbine engine system 10 may blend a different blend ratio of the first fuel to the second fuel in the premixing mode than it would in a steady state mode, startup mode, etc.

The process 126 further includes measuring a component composition of a first fuel, such as a process gas or a natural gas (block 130), blending the first fuel and a second fuel at a first ratio to create a first fuel mixture (block 132), and blending the first fuel and the second fuel at a second ratio to create a second fuel mixture (block 134). The first fuel mixture may then be transferred to a first fuel nozzle (e.g., primary fuel nozzle 20) of the combustor 14 (block 136), while the second fuel mixture may be transferred to a second fuel nozzle (e.g., secondary fuel nozzle 22) of the combustor 14 (block 138). The blocks 128, 130, 132, 134, 136, and 138 of the process 126, as illustrated in FIG. 5, may be similar to blocks 114, 116, 118, 120, 122, and 124 of the process 112, as illustrated and described with respect to FIG. 4.

Once the fuel mixtures of the fuel circuits are transferred to the fuel nozzles 18 of the combustor 14, the fuel may be routed by the fuel nozzles 18 into the primary and/or secondary combustion zones 52 and 54. As discussed in detail above, the primary and/or secondary zones 52 and 54 of the combustor 14 may be equipped with a plurality of sensors 84, which may measure one or more operating parameters of the combustor 14 (block 140). The sensors 84 may provide information on the operating and/or combustion dynamics of the combustor 14 by taking measurements on various combustion dynamics parameters. For example, as described above with respect to FIG. 2, combustion dynamics parameters may include a combustor 14 tone frequency or amplitude, flame intensity, temperature, pressure, concentration of various components of fuel sources or combustion products, and so forth. The sensors 84 may be any suitable type of sensors, such as, for example, a flame detector or an acoustic probe.

The sensors 84 may also be other types of sensors, such as, for example, optical sensors, mechanical sensors, or electrical sensors, and so forth. The sensors 84 may send measured combustor 14 operating parameter data as combustor operating feedback 88. As discussed above, the combustor operating feedback 88 may be transferred to the controller 80. The memory 82 of the controller 80 may further store the measured combustor 14 operating parameters and data.

The controller 80 may be configured to modify fuel blending of the blending skid 74 based on the operating parameter data of the combustor 14 (block 142). In this manner, the controller 80 may regulate a feedback control loop that may enable adjustment of the blending ratio of the natural gas supply 78 (e.g., natural gas) to the process gas supply 76 (e.g., process gas) within a fuel circuit of the blending skid 74 based on combustor 14 operating feedback from the primary and/or secondary combustion zones 52 and 54 or other areas of the combustor 14. For example, if the concentration of nitrogen within the first fuel circuit 90 is outside a desired or target operating parameter of the combustor 14, and the concentration of nitrogen within the process gas supply 76 is known or measured, the controller 80 may then adjust the the blend ratio in subsequent blending so that it is within desirable operating parameters. In certain embodiments, the controller 80 may continuously monitor the combustion dynamics of the combustor 14 for a stream of real-time data. Furthermore, a stream of real-time data or feedback may be used by the controller 80 to continuously or periodically adjust the blend ratio of the fuel mixtures within the first and/or second fuel circuits 90 and 92.

Technical effects of the invention include the flexible fuel blending system 50 that blends the process gas supply 76 (e.g., e.g., a blast furnace gas, a coke oven gas, a refinery flue gas, a synthetic gas generated as a result of a refinery or chemical process, or a combination thereof.) with the natural gas supply 78 (e.g., natural gas) for combustion-driven operations within the gas turbine system 10. The fuel blending system 50 may have a plurality of fuel circuits, such as the first fuel circuit 90 and the second fuel circuit 92, and each fuel circuit may independently have a different blend ratio of the natural gas supply 78 to the process gas supply 76. Additionally, the first and second fuel circuits 90 and 92 may supply respective fuel mixtures to different fuel nozzles (e.g., primary fuel nozzles 20 and secondary fuel nozzles 22). Furthermore, the controller 80 may monitor the operations of the fuel blending system 50, and may regulate blending of fuel based on a measured composition of the process gas supply 78, a measured composition of the natural gas supply 76, and/or based on real-time monitoring of various operating parameters of the combustor 14. The controller 80 may further regulate blending in a manner that achieves desired operating parameters for the combustor 14, e.g., to maintain desired or optimum combustion dynamics, emissions, process gas consumption, and reduced risk, wear, or degradation to the gas turbine system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine engine comprising a combustor; and
a fuel blending system, comprising:
a first fuel supply configured to supply a first fuel;
a second fuel supply configured to supply a second fuel;
a first fuel circuit configured to blend the first fuel and the second fuel to form a first fuel mixture, wherein the first fuel mixture has a first blending ratio of the first and second fuels;
a second fuel circuit configured to blend the first fuel and the second fuel to form a second fuel mixture, wherein the second fuel mixture has a second blending ratio of the first and second fuels; and
a controller configured to regulate blending of the first fuel mixture and blending of the second fuel mixture simultaneously, wherein the controller is configured to regulate blending based on a measured operating parameter of the combustor, and wherein the controller is configured to simultaneously regulate the blending of the first blending ratio to be different from the blending of the second blending ratio.

2. The system of claim 1, wherein the first fuel comprises a process gas and the second fuel comprises a natural gas, wherein the process gas comprises a coke oven gas, a blast furnace gas, a refinery flue gas, a synthetic gas generated as a result of a refinery or chemical process, or a combination thereof.

3. The system of claim 1, wherein the controller is configured to regulate blending of the first fuel mixture and the second fuel mixture based on a measured composition of the first fuel and/or the second fuel.

4. The system of claim 1, wherein the measured operating parameter comprises a combustion dynamics parameter, a combustor tone frequency, a combustor tone amplitude, a combustor flame intensity, a pulsation or an oscillation in pressure, temperature, flame intensity, light intensity, noise, and emissions levels, or a combination thereof.

5. The system of claim 1, wherein the gas turbine system comprises a flame detector configured to measure a flame intensity of a flame in the combustor, and the controller is configured to receive feedback from the flame detector.

6. The system of claim 1, wherein the fuel blending system comprises memory configured to store the measured operating parameters of the combustor, and desired blending ratios of the first fuel mixture and the second fuel mixture.

7. The system of claim 1, wherein the first fuel circuit is configured to supply the first fuel mixture to a primary fuel nozzle of the combustor, and the second fuel circuit is configured to supply the second fuel mixture to a secondary fuel nozzle of the combustor.

8. The system of claim 1, wherein the controller is configured to regulate blending of the first fuel mixture and the second fuel mixture based on a maximum allowable concentration of nitrogen, carbon dioxide, hydrogen sulfide, or oxygen in the first fuel or combustion products of the combustor.

9. The system of claim 1, wherein the gas turbine engine is set to a pre-mixing mode of operation, a primary mode of operation, a secondary mode of operation, a full load mode of operation, a part load mode of operation, or a combination thereof.

10. A system, comprising:
a fuel blending system, comprising:
a first fuel circuit configured to supply a first fuel mixture of a first fuel and a second fuel to a primary fuel nozzle of a turbine combustor;

a second fuel circuit configured to supply a second fuel mixture of the first fuel and the second fuel to a secondary fuel nozzle of the turbine combustor; and a controller configured to simultaneously regulate a first blending ratio of the first fuel mixture to be different from a second blending ratio of the second fuel mixture, wherein the controller is configured to simultaneously regulate blending of the first and second fuel mixtures based on a measured operating parameter of the turbine combustor, and wherein the measured operating parameter comprises a chemical composition of a burned first fuel mixture or a burned second fuel mixture within the combustor.

11. The system of claim 10, wherein the first fuel comprises a process gas and the second fuel comprises a natural gas, wherein the process gas comprises a coke oven gas, a blast furnace gas, a refinery flue gas, a synthetic gas generated as a result of a refinery or chemical process, or a combination thereof.

12. The system of claim 10, wherein the measured operating parameter comprises a combustion dynamics parameter, a combustor tone frequency, a combustor tone amplitude, a combustor flame intensity, a pulsation or an oscillation in pressure, temperature, flame intensity, light intensity, noise, and emissions levels, or a combination thereof.

13. The system of claim 10, wherein the turbine combustor comprises at least one flame detector configured to measure a flame intensity of a flame of the combustor, and the controller is configured to receive feedback from the at least one flame detector.

14. The system of claim 10, wherein the fuel blending system comprises at least one acoustic probe configured to measure a frequency or an amplitude of a tone of the combustor, and the controller is configured to receive feedback from the at least one acoustic probe.

15. The system of claim 10, wherein the turbine combustor is set to a pre-mixing mode of operation, a primary mode of operation, a secondary mode of operation, a full load mode of operation, a part load mode of operation, or a combination thereof.

16. A method, comprising:
measuring a chemical property of an operating parameter of a gas turbine combustor, wherein the chemical property of the operating parameter is used to regulate blending of a first fuel with a second fuel;

blending, via a first fuel circuit regulated by a controller, the first fuel with the second fuel based on the chemical property of the operating parameter to form a first fuel mixture having a first blending ratio; and blending, via a second fuel circuit regulated by the controller, the first fuel with the second fuel based on the chemical property of the operating parameter to form a second fuel mixture having a second blending ratio, wherein the controller is configured to simultaneously regulate blending of the first and second fuel mixtures, such that the first and second blending ratios are different from one another.

17. The method of claim 16, comprising supplying the first fuel mixture to a primary fuel nozzle of a turbine combustor and supplying the second fuel mixture to a secondary fuel nozzle of the turbine combustor.

18. The method of claim 16, wherein the first fuel comprises a coke oven gas, a blast furnace gas, a refinery flue gas, a synthetic gas generated as a result of a refinery or chemical process, or a combination thereof, and the second fuel comprises a natural gas.

19. The method of claim 18, comprising maximizing an amount of the first fuel in the first fuel mixture or the second fuel mixture based on the component composition of the first fuel and the operating parameter of the turbine combustor.

20. The method of claim 16, wherein measuring the chemical property of the operating parameter of the turbine combustor comprises measuring a change in flame intensity, a change in temperature, a chemical composition of a burned fuel within the turbine combustor, a threshold limit of nitrogen, carbon dioxide, hydrogen sulfide, or oxygen within the combustion products of the turbine combustor, or a combination thereof.

21. The system of claim 16, wherein the gas turbine combustor is set to a pre-mixing mode of operation, a primary mode of operation, a secondary mode of operation, a full load mode of operation, a part load mode of operation, or a combination thereof.

* * * * *